United States Patent [19]

Hilgendorff

[11] 4,258,869

[45] Mar. 31, 1981

[54] SADDLE PACK

[76] Inventor: Wayne P. Hilgendorff, 2850 Holiday Ranch Loop Rd., Park City, Utah 84060

[21] Appl. No.: 34,215

[22] Filed: Apr. 30, 1979

[51] Int. Cl.³ .............................................. B62J 9/00
[52] U.S. Cl. .................................. 224/32 A; 224/47; 224/151
[58] Field of Search ............... 224/47, 151, 202, 205, 224/208, 236, 31, 32 R, 32 A; 54/46; 190/60, 52, 51

[56] References Cited

U.S. PATENT DOCUMENTS

| 193,288 | 7/1877 | Suter et al. | 224/236 X |
| 235,013 | 11/1880 | Pettus | 224/236 |
| 1,464,176 | 8/1923 | Freund | 190/52 X |
| 2,180,191 | 11/1939 | Bauch | 190/52 X |
| 2,661,824 | 12/1953 | Nelson, Jr. | 190/51 |
| 2,672,263 | 3/1954 | Alber | 224/205 |
| 2,813,602 | 11/1957 | MacArthur, Jr. | 190/60 |
| 3,122,225 | 2/1964 | Ward | 190/52 |

Primary Examiner—Steven M. Pollard

Attorney, Agent, or Firm—J. Winslow Young; H. Ross Workman; Rick D. Nydegger

[57] ABSTRACT

A saddle pack including an elongated support web with a pannier-like side housing mounted at each end. The web includes a curvilinear cut-out along one edge of a center segment of the web, the curvilinear cut-out being specifically configured to conform to the cantle base of a saddle. Each of the side housings include an open top compartment and a cover for the compartment, the cover being adapted to securely enclose the compartment. An overflap is also included and substantially encloses the cover, the cover thereby providing a shelf or floor for a subcompartment formed on top of the compartment between the cover and the overflap. The side housings may also include end pockets mounted to the ends of the side housings. The web also includes at least one pouch formed therein, the pouch being foldable to provide a generally flat configuration or expandable to receive bulky items therein. The web may be foreshortened to adapt the saddle pack for placement on a motorbicycle, or the like, with a relatively narrow support such as a cross arm or seat.

25 Claims, 7 Drawing Figures

SADDLE PACK

BACKGROUND

1. Field of the Invention

This invention relates to saddle packs, and more particularly, to a novel saddle pack and method, the saddle pack including support web-mounted side housings of novel construction, the support web having a curvilinear cut-out along one edge of a center segment to assist in conforming the saddle pack to the cantle base of a saddel as well as assisting in securing the saddle pack to other means of transportation such as snowmobiles, motorcycles, as well as accommodating the saddle pack to be temporarily man-portable.

2. Prior Art

Conventional saddle bags are well known in the art and have been used for many years for the purpose of carrying on horseback small items, usually personal items, of a rider of the horse. The conventional saddle bag is configured as a relatively elongated, narrow band or web with a flap-covered pocket at each end of the web. The saddle bag is specifically adapted to be removably tied behind a saddle. If the rider desired to carry additional articles such as a bedroll, cooking utensils, or the like, it was necessary for the rider to either tie the articles individually behind the saddle or secure the extra items in a pack mounted on a pack horse. For those persons with only a riding horse and no pack horse, the foregoing presented a substantial difficulty in the event the rider decided to travel any significant distance. Not only were the items individually tied but presented substantial difficulties in setting up camp, moving camp, or even obtaining access to the items tied to the horse. Furthermore, riding through brush or close timber frequently resulted in the various items being ripped away from the saddle. As one further disadvantage, the conventional saddle bag and individually tied items are known to flop about when the horse is moving at a fast gait. Internal injury to the horse is known to result when the horse is subjected to uneven weight distribution and flopping packs or items. Bulky items are particularly difficult to carry since they do not distribute their weight uniformly and are known to cause injury to the horse from any resulting pressure points.

Saddle bag devices are known in the art and some of the saddle bag devices known to the inventor are listed below:

U.S. Pat. No. 112,819 discloses a physician's saddle bag wherein metal boxes are joined together into a saddle bag with a plate of leather attached thereto. The plate of leather forms a hinge between the metal boxes to allow access to the metal boxes. U.S. Pat. No. 495,908 relates to another physician's saddle bag wherein hinged receptacles tilt outwardly to provide access to the receptacles. An overlying flap C secures the receptacles in the closed position.

U.S. Pat. No. 761,783 relates to a saddle bag for use in the transportation of mail. A plurality of bags are formed in the saddle bag and are covered with a protective flap.

U.S. Pat. Nos. 3,786,972; 3,970,229; and 3,937,374 each relate to various configurations for convertible saddle brief cases capable of use on a bicycle or as a single luggage-type structure.

Other saddle bag or carrying bag-type structures are shown in design U.S. Pat. Nos. Des. 234,326 and Des. 247,524.

In view of the foregoing, it would be an advancement in the art to provide a novel saddle pack development specifically configured to be mounted to a horse behind the saddle, a snowmobile, a motorbicycle, or that may be readily man-portable for limited distances. It would also be an advancement in the art to provide a novel saddle pack development which is readily adaptable for numerous articles being secured thereto while maintaining certain portions of the saddle pack secure against dust or inclement weather. It would also be an advancement in the art to provide a novel saddle pack wherein a support web includes a pouch for carrying additional articles therein. It would also be an advancement in the art to provide a novel saddle pack that is readily adapted to be securely mounted to any of the foregoing means of transportation in such a manner so as to inhibit flopping, shifting or other undue movement during traverse of rough terrain or while proceeding at a relatively rapid pace. Such an invention is disclosed and claimed herein.

BRIEF SUMMARY AND OBJECTS OF THE INVENTION

The present invention relates to a novel saddle pack and method, the saddle pack including an elongated support web with a pannier-like side housing mounted at each end. The web includes a curvilinear cut-out along one edge of a center segment of the web, the curvilinear cut-out being specifically configured to conform to the cantle base of a saddle. Each of the side housings include an open top compartment and a cover for the compartment, the cover being adapted to securely enclose the compartment. An overflap is also included and substantially encloses the cover, the cover thereby providing a shelf or floor for a subcompartment formed on top of the compartment between the cover and the overflap. The side housings may also include end pockets mounted to the ends of the side housings. The web also includes at least one pouch formed therein, the pouch being foldable to provide a generally flat configuration or expandable to receive bulky items therein. The web may also be foreshortened to more readily adapt the saddle pack of this invention for placement, for example, on a motorbicycle, or the like, with a relatively narrow support such as a cross arm or seat.

In view of the foregoing, it is primary object of this invention to provide improvements in saddle packs.

Another object of this invention is to provide an improved method for providing a saddle pack that is readily man-portable and also readily adaptable to being placed on a horse, snowmobile, or motorbicycle.

Another object of this invention is to provide a novel saddle pack having a support web for supporting a side housing at each end of the support web, the support web further including a pouch means therein.

Another object of this invention is to provide a novel saddle pack wherein a curvilinear cut-out is formed along one edge of the center section of the support web, the curvilinear cut-out being specifically configured to conform to a cantle base of a saddle.

Another object of this invention is to provide a novel saddle pack wherein side housings are mounted to each end of a support web, each side housing having an open top compartment therein, the open top compartment being provided with a secure cover, the cover serving as a shelf or basal element for a secondary compartment formed between the cover and an overflap enveloping the cover.

These and other objects and features of the present invention will become more fully apparent from the following description and appended claims taken in conjunction with the accompanying drawing.

DETAILED DESCRIPTION OF THE PREFERRED EMBODIMENTS

Figure 1:
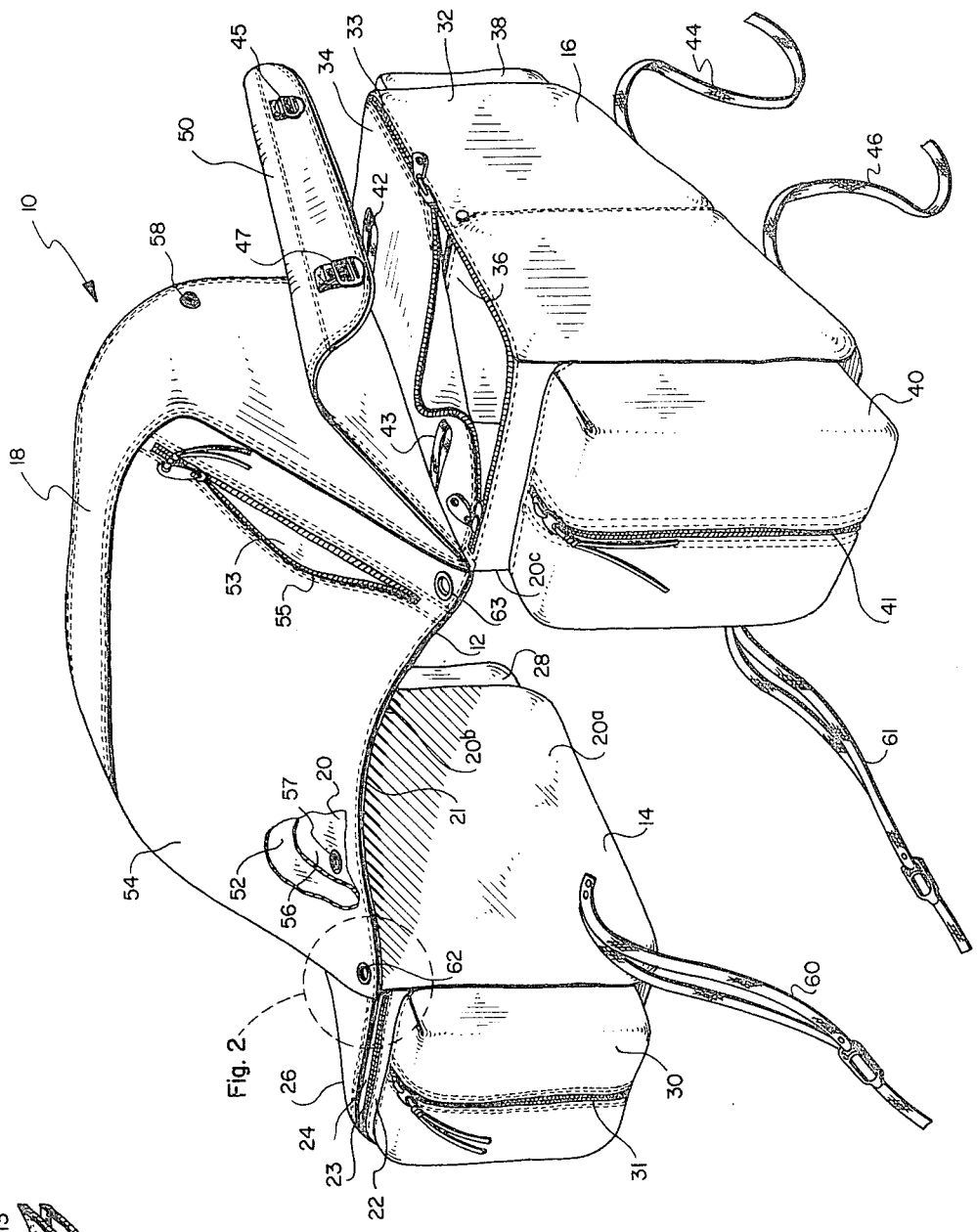
FIG. 1 is a perspective view of one preferred embodiment of the saddle pack of this invention with portions broken away to reveal internal and hidden structure.

The invention is best understood by reference to the drawing wherein like parts are designated with like numerals throughout.

Referring now to FIG. 1, the novel saddle pack of this invention is shown generally at 10 and includes a support web 12 with an elongated support panel 20 with an expandable pouch member 18 mounted thereon and having ends 20a and 20c at each end of a center segment 20b. A side housing 14 is mounted on end 20a and a side housing 16 is mounted on end 20c. Center segment 20b includes a curvilinear cut-out 21 along one edge. Advantageously, pouch member 18 is foldable into a generally flat configuration against center segment 20b or expandable into a greatly enlarged pouch having a generally trapezoidal cross section, as will be discussed more fully hereinafter.

A face 54 on the forward edge of pouch member 18 serves as an outer cover for a secondary pouch 53, access to which is obtained through a zipper 55. The bottom of secondary pouch 53 is formed by a second layer of fabric 52 so that secondary pouch 53 is formed along one face of pouch member 18. Pouch member 18 is configurated such that face 54 resides at an acute angle, preferrably about 45°, relative to center segment 20b to allow saddle pack 10 and, more particularly, pouch member 18, when expanded, to be more snugly secured against a cantle 74 (see FIG. 3). Also, the acute angle of face 54 reduces the obstacle presented by a filled pouch member 18 during mounting and dismounting of horse 70 (FIG. 3).

Figure 3:
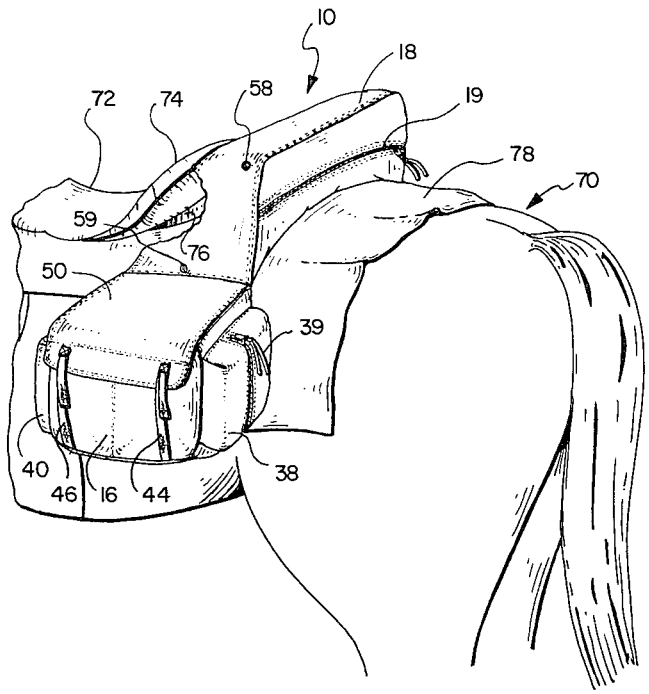
FIG. 3 is a perspective view of the novel saddle pack of this invention mounted to a horse with portions broken away to reveal hidden features.
Figure 4:
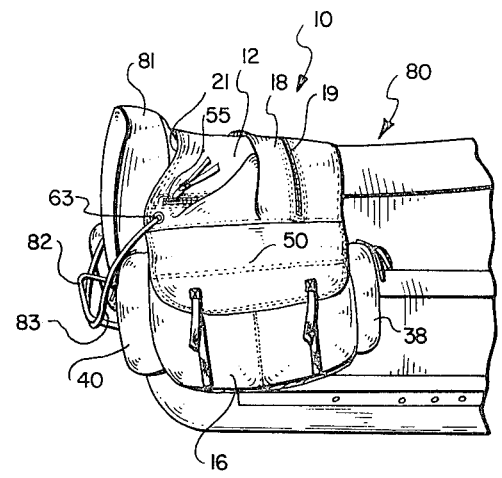
FIG. 4 is a schematic illustration of the novel saddle pack of this invention mounted to a snowmobile.
Figure 5:
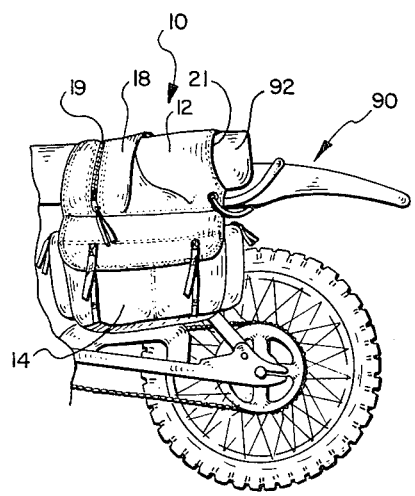
FIG. 5 is a schematic illustration of the novel saddle pack of this invention mounted to a motorbicycle.

A snap 58 and a corresponding snap 59 (FIGS. 3 and 6) adapts pouch member 18 and center segment 20b to being folded into a generally flap configuration as shown in FIGS. 4 and 5. While pouch member 18 may be dispensed with entirely leaving merely support panel 20 as the support member for side housings 14 and 16, the versatility of saddle pack 10 is greatly enhanced by the utility provided by pouch member 18 as an integral part of support web 12. A plurality of grommets 57 may be included in pouch member 18 for use in securing bulky items inside pouch member 18.

Figure 7:
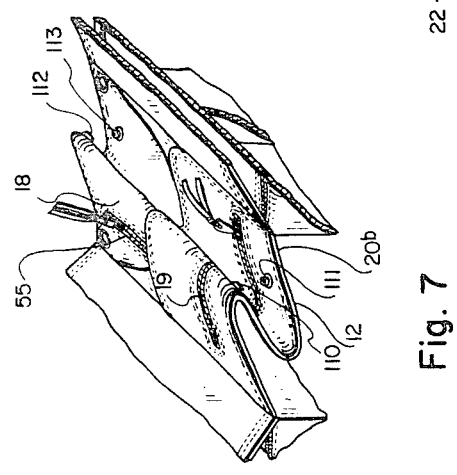
FIG. 7 is a partial schematic and perspective illustration of the support web of the novel saddle pack of this invention showing the web being folded laterally to accommodate being fastened in the folded configuration to foreshorten the support web.

Referring now more particularly to FIG. 7, support web 12 including pouch member 18 and support panel 20 and, more particularly, center segment 20b, is shown as being folded in a lateral direction thereby substantially foreshortening center segment 20b. The folded configuration of support web 12 is secured by snaps 110–113 which can be of any commercially available snap with sufficient holding power to withstand the stresses placed on center segment 20b by the weight in side housings 14 and 16 (FIG. 1). It is, of course, clearly understood that pouch member 18 is substantially empty in order to accommodate the folding action illustrated herein.

Referring now more particularly to FIG. 3, the importance of cut-out segment 21 is more clearly illustrated by showing the saddle pack 10 mounted behind a saddle 72 secured to a horse 70. Saddle 72 includes a cantle portion 74 which forms the rim to the rear of saddle 72. Cantle 74 includes a basal support element in the form of a cantle base 76. Cantle base 76 has a generally curvilinear profile underneath cantle 74 and the curvilinear profile of cut-out 21 is specifically configurated to conform thereto. Clearly, of course, no claim is made to the external profile of cantle base 76 although the curvilinear profile of cut-out 21 is specifically configurated to closely conform to the profile of cantle base 76. It should be noted that while the web of a conventional saddle bag has a limited curvilinear segment, it only tangentially touches a portion of cantle base 76 and does not substantially conform thereto as does cut-out 21 of saddle pack 10. The conformation of cut-out 21 to the curvilinear profile of cantle base 76 greatly assists in providing a surprisingly stabilizing effect to saddle pack 10 in its securement to saddle 72. Securement of saddle pack 10 to saddle 72 is also achieved, in part, by passing a suitable tie-down lanyard through grommets 62 and 63 (FIG. 1) at each end of curvilinear cut-out 21. Additionally, flopping straps 60 and 61 (FIG. 1) assist in inhibiting the flopping or otherwise undue movement of side housings 14 and 16 relative to saddle 72. As set forth hereinbefore, the acute angle of face 54 also allows pouch member 18 to be snugly conformed behind and beneath cantle 74 to (a) more securely mount saddle pack 10 to saddle 72 and (b) shift the weight thereof forward to the best possible degree.

In actual tests with a prototype of saddle pack 10 mounted to a saddle 72 on a horse 70 and secured by the combination of features set forth hereinbefore, it was found that a rider (not shown) could readily ride the horse 70 at any pace, including a full gallop, without undue flopping or shifting of saddle pack 10 and, more importantly, side housings 14 and 16. This is particularly advantageous since it is well known that a poorly secured saddle bag system, particularly if heavily weighted and allowed to strike the horse, will result in internal injuries to the horse, including, for example, loin and kidney damage. It is, therefore, extremely important that any saddle pack and, more particularly, any saddle packs that are heavily loaded, be securely mounted to the saddle to prevent undue movement of the saddle pack relative to the horse.

Referring now more particularly to FIG. 4, another advantage to the curvilinear cut-out 21 is shown in that cut-out 21 readily adapts saddle pack 10 to being mounted to the rear portion of a seat of a snowmobile 80. In particular, most commercial models of snowmobile 80 include a raised portion 81. Surprisingly, it has been found that curvilinear cut-out generally conforms to the external profile of raised portion 81 so that saddle pack 10 may be readily secured to a bumper 82 by a lanyard 83 passed through grommet 63 and corresponding grommet 62 (FIG. 1). In actual tests with saddle pack 10 secured to a snowmobile 80 as set forth hereinbefore, it was possible to drive snowmobile 80 at a relatively high rate of speed over relatively rough terrain without undue shifting or flopping of saddle pack 10.

Figure 6:
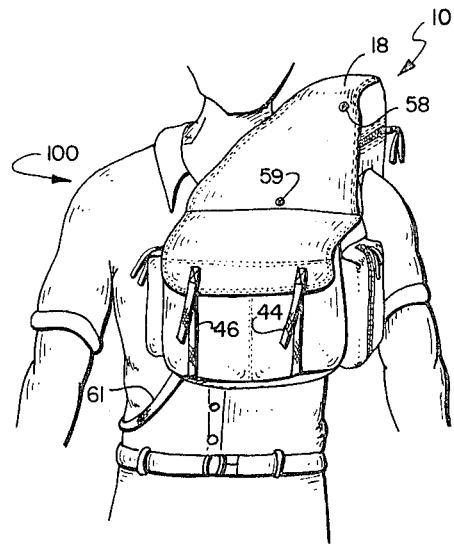
FIG. 6 is a schematic illustration of the novel saddle pack of this invention being carried by a man.

While pouch member 18 is shown in the empty and folded configuration in FIG. 4, it should be clearly understood that pouch member 18 may be utilized in the unfolded or containment configuration illustrated in FIGS. 1, 3 and 6. However, for ease of illustration and to further illustrate the versatility of this invention, pouch member 18 is shown herein in a generally folded configuration.

Referring now more particularly to FIG. 5, saddle pack 10 is shown as mounted to a seat 92 of a motorbicycle 90. Pouch member 18 is also shown in the generally flat or folded configuration and may also, advantageously, be foreshortened for narrow motorcycle seats 92 or bicycle frames, or the like, by selectively folding and securing support web 12 as shown in FIG. 7. In either configuration, saddle pack 10 is readily adapted to be securely mounted to motorbicycle 90.

With particular reference to FIG. 6, saddle pack 10 also lends itself well to being readily man-portable particularly since cut-out segment 21 generally conforms across the neck of a person 100. The major weight of saddle pack 10 is shifted toward the center thereby readily adapting saddle pack 10 to being carried from place to place. Clearly, of course, saddle pack 10 is not intended to be primarily man-portable but to be readily adapted to being secured to a saddle 72 on a horse 70 (FIG. 3); a snowmobile 80 (FIG. 4); and a motorbicycle 90 (FIG. 5). However, in many instances it is not possible to ride the particular mode of conveyance to the desired location for camping where saddle pack 10 will be ultimately used. Accordingly, it is highly advantageous that saddle pack 10 is readily adapteable to being man-portable. Under these conditions, cut-out segment 21 generally conforms across the shoulder adjacent the neck of the person 100 while flopping strap 61 may be selectively joined with flopping strap 60 (FIG. 1) so as to secure saddle pack 10 to person 100.

Referring again to FIG. 1, saddle pack 10 includes side housings 14 and 16 which are substantially identical. In particular, with reference to side housing 16, side housing 16 includes a compartment 32 which may be, selectively, segregated by a vertical divider 36 into subcompartments. Vertical divider 36 laterally segregates compartment 32 into two compartments or subcompartments. In addition to laterally segregating compartment 32 into subcompartments, vertical divider 36 also provides additional dimensional stability or integrity for compartment 32 by limiting the degree to which the sidewalls of compartment 32 may be extended outwardly upon filling the same with goods (not shown.) Compartment 32 is covered by a closure 34 which is secured thereto by a zipper member 33. Advantageously, closure 34 serves not only to seal the contents of compartment 32 against dirt, dust and inclement weather but also provides a platform or shelf in cooperation with an overflap 50 to thereby provide a secondary or subcompartment therebetween. This is particularly advantageous for engaging items which would otherwise not fit within compartment 32 or pouch member 18. For example, fishing poles, tent poles, and the like may be secured to saddle pack 10 by placing the same across closure 34 and securing the same thereto by securing strap 46 to buckle 47, and likewise, strap 44 to buckle 45. Additional securement is provided by loops 42 and 43 which are selectively fabricated from an elastic material. For example, a fishing pole cannister may be inserted through loops 42 and 43 and further secured by strapping down overflap 50 thereover. Similar features are provided for side housing 14 through overflap 26 in cooperation with closure 34 being secured to compartment 22 by zipper 23.

As an additional feature, a plurality of end pockets 38 and 40 may be mounted at each end of side housing 14 while end pockets 28 and 30 may be secured to each end of side housing 14. End pocket 30 is closed by a vertical zipper 31 while end pocket 40 is closed by a zipper 41 and end pocket 38 is closed by a zipper 39 (FIG. 3).

Figure 2:
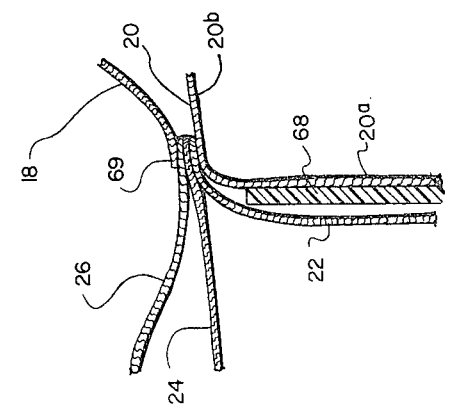
FIG. 2 is an enlarged, fragmentary cross section of the area indicated at a broken circle designated as FIG. 2 in FIG. 1.

Referring now more particularly to FIG. 2, the details of construction of a portion of saddle pack 10 are shown with particular emphasis at the stress point encountered between center segment 20b of support panel 20 and the various components of side housing 14 (FIG. 1) and also pouch member 18. In particular, support panel 20 is shown as a continuous member between center segment 20b and side element 20a with an inner wall 22, closure 24 and overflap 26 joined thereto at a seam 69 and surmounted by the outer wall of pouch member 18. Accordingly, five fabric surfaces are joined along seam 69. Seam 69 is fabricated as a plurality of sequentially stitched seams so that the joint illustrated as seam 69 is a very strong joint thereby greatly resisting tearing, and the like. Additional strength is incorporated into saddle pack 10 by fabricating the various fabric surfaces from a suitable, high-strength, non-rip nylon material while preselected stress points may be reinforced with rivets or the like.

A stiffener 68 is sandwiched between the cloth layers 22 and 20a to provide the appropriate stiffening to the inner walls of side housings 14 and 16. Stiffener 68 is selectively fabricated from a suitable sheet of rigid plastic material and is permanently incorporated into the structure of saddle pack 10. While stiffener 68 is not required in all circumstances, it has been found advantageous in that it contributes to the structural and dimensional integrity of saddle pack 10.

The method of this invention includes providing the curvilinear cut-out 21 in support web 12 and, more particularly, in center segment 20b, so that support web 12 can be closely conformed to cantle base 76, as set forth hereinbefore, thereby providing a substantially increased securement capability to saddle pack 10 when placed on a horse 70 by securing the same to a saddle 72. Additionally, saddle pack 10 may be placed directly across the seat of saddle 72 is those instances when a particularly heavy load is to be carried in saddle pack 10. Under these conditions, cut-out 21 has been found to conform also to the general curvilinear profile of the swell fork that forms the base to the horn (not shown) of saddle 72. When thus placed, saddle pack 10 and, more particularly, support web 12 is supported directly on the seat of saddle 72 in the position at which the horse 70 is prepared to carry the greater weight. This is particularly advantageous in those conditions where it is desired to use horse 70 as a pack horse or where circumstances indicate that an additional weight carrying capability is necessary for saddle pack 10. Under other conditions when a lighter load is being carried, saddle pack 10 is most advantageously secured behind saddle 72 with the curvilinear cut-out 21 conforming to cantle base 76 as set forth hereinbefore. Additionally, for horses of a generally spooky nature and unaccustomed to having saddle pack 10 placed behind saddle 72, it is advantageous to initially mount saddle pack across the seat of saddle 72 and thereafter lift or otherwise slide saddle pack 10 rearwardly over cantle 74 and rest the same on saddle blanket 78 as set forth previously. Accordingly, saddle pack 10 is readily adaptable to being used in combination with a rider or singly as an independent saddle pack configuration with horse 70 serving as either the riding or a pack horse. Additionally, as shown throughout, saddle pack 10 is readily adaptable to being mounted on substantially any vehicular means of transportation such as snowmobile 80 (FIG. 4), motorbicycle 90 (FIG. 5) or also being man-portable for limited distances.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by U.S. Letters Patent is:

1. A saddle pack comprising:
   a first side housing, the first side housing comprising a first compartment having a zippered closure and a first overflap, the first overflap serving as a first cover over the first compartment and zippered closure;
   a second side housing, the second side housing comprising a second compartment having a zippered closure and a second overflap, the second overflap serving as a second cover over the second compartment and zippered closure; and
   a support web interconnecting the first side housing and the second side housing, the support web comprising a panel having a curvilinear cutout along one edge of a center segment, the cutout being specifically configured to conform to the cantle base of a saddle, the support web supporting the first side housing and the second side housing in a generally vertical orientation when the saddle pack is mounted to the saddle, said support web further comprising a pouch means having at least one zipper-enclosed pouch.

2. The saddle pack defined in claim 1 wherein the pouch means comprises an expandable pouch, the expandable pouch extending by being unfolded to receive relatively bulky items and folding against the support web to provide a relatively flat profile.

3. The saddle pack defined in claim 2 wherein the pouch means further comprises internal tie down means for securing the relatively bulky items placed inside the pouch means.

4. The saddle pack defined in claim 2 wherein the pouch means further comprises securement means for fastening the pouch means in the flat profile.

5. The saddle pack defined in claim 2 wherein the pouch means further comprises a front face having an acute angular orientation when the pouch means is expanded, the front face extending upwardly from the curvilinear cut-out.

6. The saddle pack defined in claim 1 wherein the first and second overflap are each configured to cover the respective zippered closure with the zippered closure cooperating with the respective overflap to form a secondary compartment on top of the compartment with the respective zippered closure forming a floor for the respective secondary compartment.

7. The saddle pack defined in claim 6 wherein the secondary compartment further comprises securement means for assisting in securing items placed in the secondary compartment.

8. The saddle pack defined in claim 7 wherein the securement means comprises a plurality of elastic loops between the overflap and the closure means.

9. The saddle pack defined in claim 1 wherein the compartment comprises a vertical divider means for segregating the compartment into subcompartments and for providing additional dimensional integrity to the compartment.

10. The saddle pack defined in claim 1 wherein the first side housing and the second side housing comprise end pockets mounted to the ends of the first side housing and the second side housing.

11. The saddle pack defined in claim 1 wherein the support web comprises a unitary piece of fabric with the compartments secured thereto, the fabric extending from an inside surface of the first side housing through the center segment and to an inside surface of the second side housing.

12. The saddle pack defined in claim 11 wherein the saddle pack further comprises a stiffening means adjacent the unitary fabric on the inside surface of the first side housing and the second side housing.

13. The saddle pack defined in claim 12 wherein the stiffening means comprises a sheet of stiff plastic material sandwiched between the fabric of the support web and the fabric of the side housing.

14. The saddle pack defined in claim 1 wherein the first side housing and the second side housing further comprise tie down means to inhibit movement of the first side housing and the second side housing.

15. A saddle pack comprising:
   a first side housing;
   a second side housing; and
   a support web interconnecting the first side housing and the second side housing, the support web comprising a panel having a curvilinear cutout along one edge of a center segment, the cutout being specifically configured to conform to the cantle base of a saddle, the support web supporting the first side housing and the second side housing in a generally vertical orientation when the saddle pack is mounted to the saddle, the support web further comprising a pouch means having at least one zipper-enclosed pouch, the pouch means comprising an expandable pouch, the expandable pouch expanding by being unfolded to receive relatively bulky items and folding against the support web to provide a relatively flat profile, the pouch means further comprising securement means for fastening the pouch means in the flat profile, the securement means comprising engagement means for folding the support web in a transverse direction to foreshorten the support web and securing the fold thereby providing a foreshortened support web for the saddle pack.

16. A saddle pack comprising:
a support web comprising a unitary fabric element and having a curvilinear cutout along one edge of a central margin of the web;
a pouch means secured to the central margin of the support web adjacent the curvilinear cutout;
a first side housing secured to one end of the support web adjacent a first side of the central margin, the first side housing comprising a first compartment having a zippered closure and a first flap serving as a first cover over the first compartment and zippered closure;
a second side housing secured to the other end of the support web adjacent a second side of the central margin, the second side housing comprising a second compartment having a zippered closure and a second flap serving as a second cover over the second compartment and zippered closure; and
securement means for securing the saddle pack to an object wherein the support web is placed across the object, the securement means further inhibiting movement relative to the object by the first side housing and the second side housing.

17. The saddle pack defined in claim 16 wherein the pouch means comprises a primary pouch and a secondary pouch, the primary pouch comprising an extendable pouch having a sloping surface extending upwardly from the curvilinear cutout edge to a generally rectilinear pouch configuration and with the secondary pouch formed in the upwardly sloping surface.

18. The saddle pack defined in claim 17 wherein the pouch means is foldable into a generally flat configuration with the secondary pouch on the top surface of the flat configuration.

19. The saddle pack defined in claim 16 wherein the support web further comprises stiffening means adjacent each of the first side housing and the second side housing.

20. The saddle pack defined in claim 16 wherein the first side housing and the second side housing further comprise end pockets, the end pockets having zippered openings.

21. The saddle pack defined in claim 16 wherein the support web further comprises securement means for securing the central margin of the support web in a folded configuration, the fold running transverse to the web and serving to foreshorten the support web.

22. A method for providing a saddle pack adaptable to be placed on a horse, snowmobile, and motor bicycle, and to be man-portable comprising:
preparing a support web for the saddle pack, the support web having a curvilinear cut-out segment along one edge of a center segment of the support web, the curvilinear cutout segment corresponding to the profile of a cantle base of a riding saddle;
forming a pouch means on the center segment of the support web and adapting the pouch means to be foldable into a generally flat configuration and expandable into a generally trapezoidal configuration with a face of the pouch means extending upwardly from the curvilinear cutout segment at an acute angle thereby readily conforming the pouch means to the cantle base of the riding saddle;
fabricating a pair of side housings for each end of the support web, each side housing having a compartment and a cover for the compartment with cover securement means for securing the cover to the compartment, each side housing also including an overflap for the compartment so that the cover to the compartment serves as a basal surface to the overflap thereby forming a secondary compartment above the compartment; and
securing a side housing to each end of the support web thereby adapting the saddle pack to be man-portable and also to be mounted on at least one of a horse, a snowmobile and a motorbicycle with the cutout segment assisting in conforming the support web to the object upon which the saddle pack is placed.

23. A method for providing a saddle pack adaptable to be placed on a horse, snowmobile, and motorbicycle, and to be man-portable comprising:
preparing a support web for the saddle pack, the support web having a curvilinear cut-out segment along one edge of a center segment of the support web, the curvilinear cut-out segment corresponding to the profile of a cantle base of a riding saddle;
mounting securement means to the center segment of the support web, the securement means adapting the center segment of the support web to being folded transversely thereby foreshortening the center segment;
fabricating a pair of side housings for each end of the support web, each side housing having a compartment and a cover for the compartment with cover securement means for securing the cover to the compartment, each side housing also including an overflap for the compartment so that the cover to the compartment serves as a basal surface to the overflap thereby forming a secondary compartment above the compartment; and
securing a side housing to each end of the support web thereby adapting the saddle pack to be man-portable and also to be mounted on at least one of a horse, a snowmobile and a motorbicycle with the cut-out segment assisting in conforming the support web to the object upon which the saddle pack is placed.

24. A pack comprising:
a first side housing;
a second side housing;
a multilayer support web interconnecting the first side housing and the second side housing; and
a convertible pouch means as an integral part of the support web, the convertible pouch means comprising a compartment formed between an upper layer and a lower layer of the support web and being foldable into a first, generally flat configuration anmd expandable into a second, substantially enlarged configuration.

25. A pack comprising:
a first side housing comprising a first compartment comprising a first receptacle and a first zippered closure means for the first receptacle and a first overflap having a first securement means for securement of the first overflap over the first compartment with the first zippered closure means serving as a first shelf means under the first overflap;
a second side housing comprising a second compartment comprising a second receptacle and a second zippered closure means for the second receptacle and a second overflap having a second securement means for securement of the second overflap over the second compartment with the second zippered closure means serving as a second shelf means under the second overflap; and a support web interconnecting the first side housing with the second side housing, said support web comprising a pouch means having at least one zipper-enclosed pouch.

* * * * *

UNITED STATES PATENT AND TRADEMARK OFFICE
CERTIFICATE OF CORRECTION

PATENT NO. : 4,358,869
DATED : November 16, 1982
INVENTOR(S) : Andrew Frankus

It is certified that error appears in the above-identified patent and that said Letters Patent is hereby corrected as shown below:

In the drawings:

Fig. 3 -- The unit of measurement of the ordinate should be changed from "(2000 deg/SEC)" to read --(200 deg/SEC)--

Fig. 4 -- The unit of measurement of the ordinate should be changed from "(2000 deg/SEC 2)" to read --(2000 deg/SEC$^2$)--

Signed and Sealed this

Twenty-fourth Day of July 1984

[SEAL]

Attest:

GERALD J. MOSSINGHOFF

Attesting Officer     Commissioner of Patents and Trademarks